(12) United States Patent
Barcin

(10) Patent No.: US 7,775,036 B2
(45) Date of Patent: Aug. 17, 2010

(54) EXHAUST GAS SUBSEQUENT TREATMENT METHOD AND METHOD THEREFOR

(75) Inventor: Buelent Barcin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 492 days.

(21) Appl. No.: 11/721,194

(22) PCT Filed: Nov. 18, 2005

(86) PCT No.: PCT/EP2005/056050

§ 371 (c)(1),
(2), (4) Date: Jun. 8, 2007

(87) PCT Pub. No.: WO2006/074833

PCT Pub. Date: Jul. 20, 2006

(65) Prior Publication Data

US 2009/0255232 A1    Oct. 15, 2009

(30) Foreign Application Priority Data

Jan. 17, 2005 (DE) .................. 10 2005 002 318

(51) Int. Cl.
*F01N 3/00* (2006.01)
(52) U.S. Cl. ............... 60/286; 60/274; 60/277; 60/295; 60/303
(58) Field of Classification Search ........... 60/274, 60/286, 297, 300, 301, 303, 277, 295
See application file for complete search history.

(56) References Cited

U.S. PATENT DOCUMENTS 5,522,218 A     6/1996  Lane et al.
5,884,475 A *   3/1999  Hofmann et al. ............ 60/274
5,968,464 A    10/1999  Peter-Hoblyn et al.
6,203,770 B1    3/2001  Peter-Hoblyn et al.
6,273,120 B1    8/2001  Hofmann et al.
6,519,935 B2 *  2/2003  Weigl ........................ 60/286
6,810,661 B2 * 11/2004  Lambert et al. ............ 60/286
7,449,162 B2 * 11/2008  Schaller et al. ............ 423/212
7,594,393 B2 *  9/2009  Offenhuber et al. ....... 60/286
2003/0033799 A1  2/2003  Scheying
2004/0098978 A1  5/2004  Tarabulski et al.
2009/0101656 A1 * 4/2009  Leonard ..................... 220/562

FOREIGN PATENT DOCUMENTS

EP    1283332 A2    12/2000
WO    0075643 A1    12/2000
WO    2005024194 A1  3/2005

* cited by examiner

*Primary Examiner*—Tu M Nguyen
(74) *Attorney, Agent, or Firm*—Ronald E. Greigg (57) ABSTRACT

A method and device for treating exhaust gases of an internal combustion engine with a reducing agent introduced into the exhaust gases. The reducing agent is pumped out of a reactant reservoir and to a dosing valve so that after the dosing valve is opened, the reducing agent can be introduced into the engine's exhaust gas line in a dosed manner. Reducing agent can be conveyed back from the delivery device to the reservoir via a return line. The reducing agent can circulate between the delivery device and the reactant reservoir thereby, particularly when the dosing valve is closed, preventing the reactant from freezing.

13 Claims, 7 Drawing Sheets

EXHAUST GAS SUBSEQUENT TREATMENT METHOD AND METHOD THEREFOR

CROSS-REFERENCE TO RELATED APPLICATION

This application is a 35 USC 371 application of PCT/EP 2005/056050 filed on Nov. 18, 2005.

BACKGROUND OF THE INVENTION

1. Field of the Invention

The invention is based on a method and apparatus for aftertreatment of exhaust gases of an internal combustion engine.

2. Description of the Prior Art

DE 199 46 902 A1 has disclosed the introduction of a urea/water solution into the exhaust train downstream of an engine to remove nitrogen from the exhaust and the provision of a return line from a supply pump back to a urea tank, which line serves to reduce an excess pressure that may potentially be present in the urea line and, for example, to bleed air from the urea line; but especially in freeze-critical situations, particularly at times other than when the reducing agent is being metered into the exhaust train, no continuous heat exchange is provided between the urea/water solution and freeze-endangered regions of the exhaust aftertreatment apparatus.

In addition, DE 102 54 981 A1 has disclosed using compressed air to remove reducing agent still contained in reducing agent-conveying lines after the metering.

SUMMARY AND ADVANTAGES OF THE INVENTION

The method and apparatus according to the invention have the advantage over the prior art of offering a simple, space-saving, and effective alternative for preventing freezing of an exhaust gas aftertreatment apparatus, which alternative, on the mechanical side, can be largely implemented with already existing installations and can be easily implemented in a software-based way. In particular, a circulation of reactant provides good protection against freezing, even with low metering quantities and when there is a cold headwind.

Advantageous modifications and improvements of the method and apparatus for exhaust aftertreatment are disclosed. It is particularly advantageous to provide a circulation in a supply module that is connected to a metering device by means of a supply line. While taking up a small amount of space, this assures an effective freeze prevention, particularly in connecting regions or at connector plugs that produce connections with the reactant reservoir.

It is also advantageous if a reactant circulation is provided, particularly during times at which the metering operation is not occurring and/or when the internal combustion engine is switched off, so that pressure fluctuations in the lines that may be caused by the circulating operation do not interfere with the actual metering operation and a freeze prevention is assured even when the vehicle is parked.

It is also advantageous to provide a protection against drainage of the vehicle battery in order to assure that it is possible to restart the internal combustion engine at any time.

It also saves energy to provide a circulating operation only when the temperature falls below a certain threshold below which there is a danger of the on-board fluid reactant freezing in freeze-endangered regions.

BRIEF DESCRIPTION OF THE DRAWINGS

Exemplary embodiments of the invention are explained in detail in the subsequent description, taken with the drawings, in which.

DESCRIPTION OF THE PREFERRED EMBODIMENTS

Figure 1:
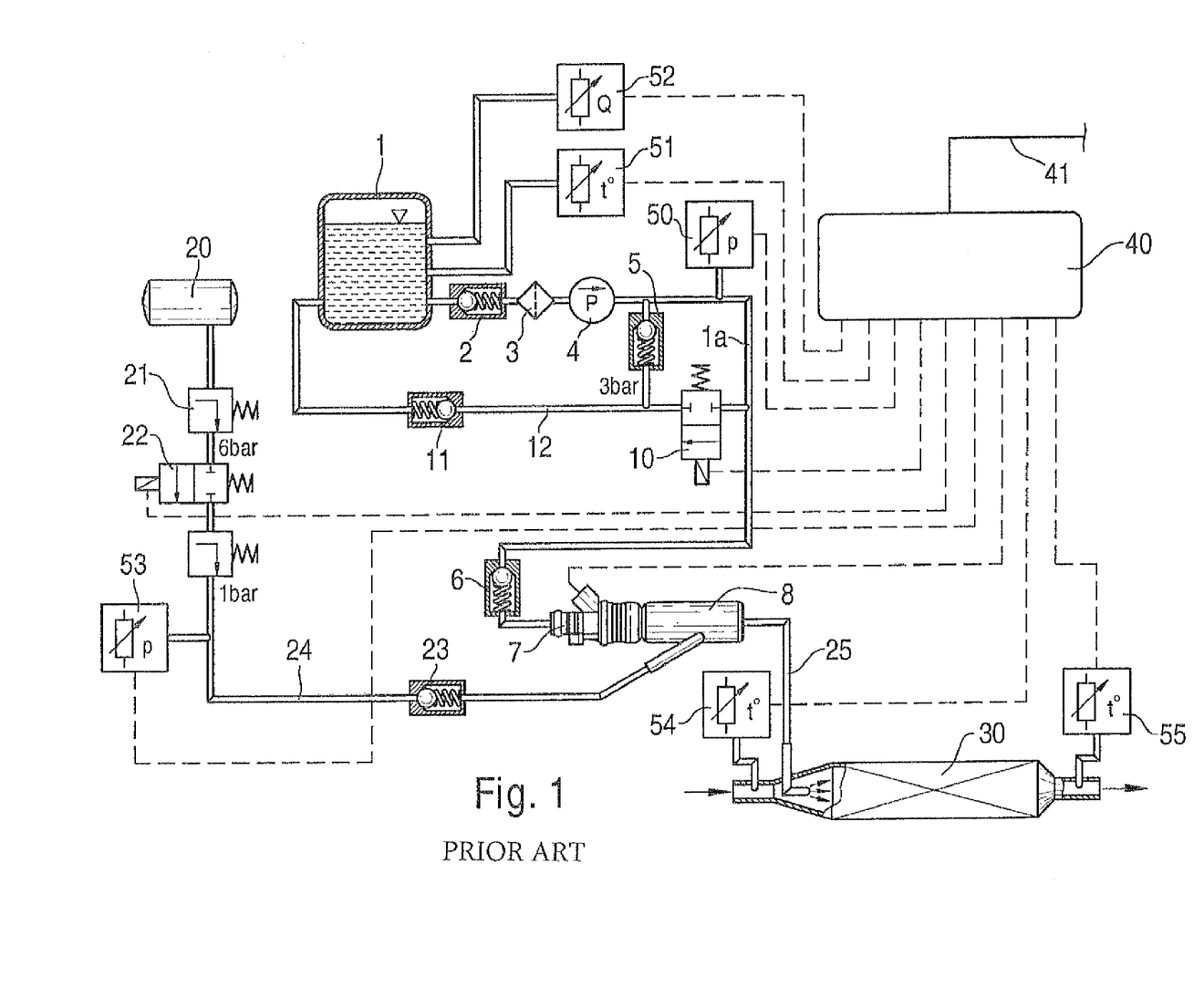
FIG. 1 shows an exhaust aftertreatment apparatus known from DE 199 46 902.

FIG. 1 shows a known apparatus for aftertreatment of exhaust gases. The reference numeral 1 indicates a urea tank from which a urea/water solution is drawn by a supply pump 4 via a line 1a, for example a flexible tube, with a check valve 2 and a filter 3 embodied in the form of a filter screen and conveyed via an additional check valve 6 to a metering valve 7. The metering valve 7 meters the required quantity of urea/water solution into a mixing chamber 8. A potential overflow quantity of the urea/water solution can be returned to the urea tank 1 through a return line 12 passing through a pressure regulator 5 and an additional check valve 11. A potentially required bleeding of air from the line 1a can be executed via a bleed circuit equipped with a bleed valve 10. The reference numeral 20 indicates a compressed air reservoir from which compressed air can be introduced into the mixing chamber via a pressure limiter 21, a 2/2-way valve 22, and a check valve 23. The provision of the check valve 23—which can, for example, be embodied in the form of a ball valve or flat seat valve—can prevent a reducing agent/air mixture from flowing out of the mixing chamber and back into the compressed airline 24. By comparison with the conventional systems, this sharply reduces the risk of a contamination of an on-board compressed air circuit communicating with the compressed airline 24.

In the mixing chamber 8, an aerosol is generated through the action of the compressed air on the urea/water solution and is introduced via an aerosol line 25 into a catalytic converter 30. In this case, a control unit 40 detects signals that are received from an overriding motor control unit via a CAN data line 41 as well as the signals that are received from pressure sensors, temperature sensors, and fill-level sensors 50 through 55 whose functions are known in and of themselves and will not be explained in detail here. Based on these data, the control unit 40 calculates a urea metering quantity that should be added to an exhaust flowing through the catalytic converter 30.

With the aid of the above-described solenoid valves, the control unit 40 controls the pressure in the compressed airline 24 and also monitors the pressure of the urea/water solution. The control unit 40 detects deviations and errors, stores them, and displays them, for example, on a PC by means of a diagnostic device that is not shown.

Figure 2A:
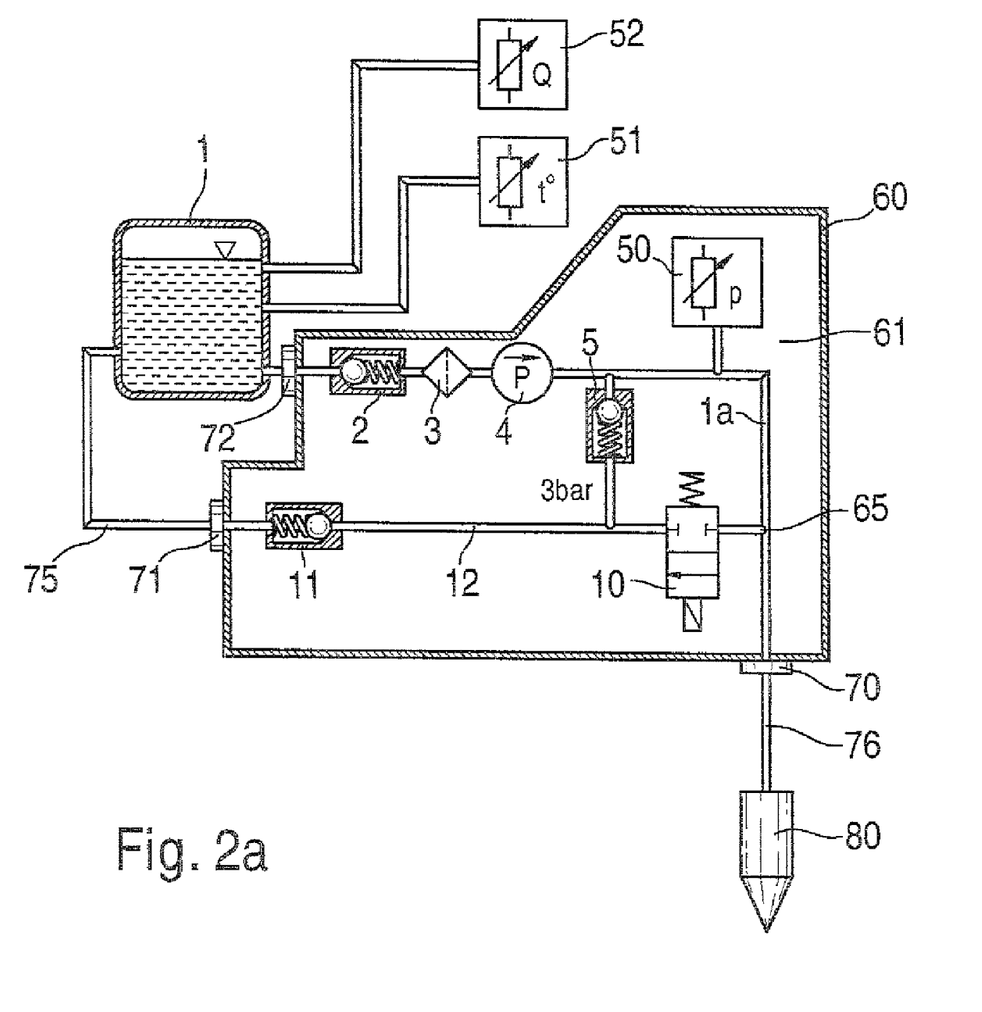
FIG. 2a shows an apparatus for reactant-assisted exhaust aftertreatment without compressed air assistance, equipped with a supply module.

FIG. 2a shows an apparatus for exhaust aftertreatment in which components that are the same as those in the arrangement according to FIG. 1 have been labeled with the same reference numerals and will not be described further. The electrical connections to a control unit 40 are the same as in the arrangement according to FIG. 1, but are not shown here. The check valve 2, the filter 3, the supply pump 4, the pressure regulator 5, the pressure sensor 50, the line 1a, the bleed valve 10, the return line 12, and the additional check valve 11 are structurally integrated into a supply module 61 that is enclosed by a housing 60. The urea tank in this case is connected to the check valve 2 by means of a connector plug 72 that connects the line leading away from the tank to the line 1a that is situated inside the supply module and leads to the check valve 2. Similarly, the additional check valve 11 in the return line 12 is connected by means of an additional connector plug 71 to an extension 75 of the return line, for example in the form of a flexible tube, leading to the urea tank. Downstream of the branch point 65 at which the return line 12 branches off, the line 1a is connected by means of an additional connector plug 70 to a supply line 76 that leads to a metering valve 80.

By contrast with the apparatus according to FIG. 1 the supply of the urea/water solution into the exhaust line occurs without the assistance of compressed air. If the valve 80 is open, the urea/water solution is injected directly into the exhaust train without being mixed with compressed air. To this end, the metering valve can be situated close to the exhaust line and its opening can protrude directly into the exhaust line.

Figure 2B:
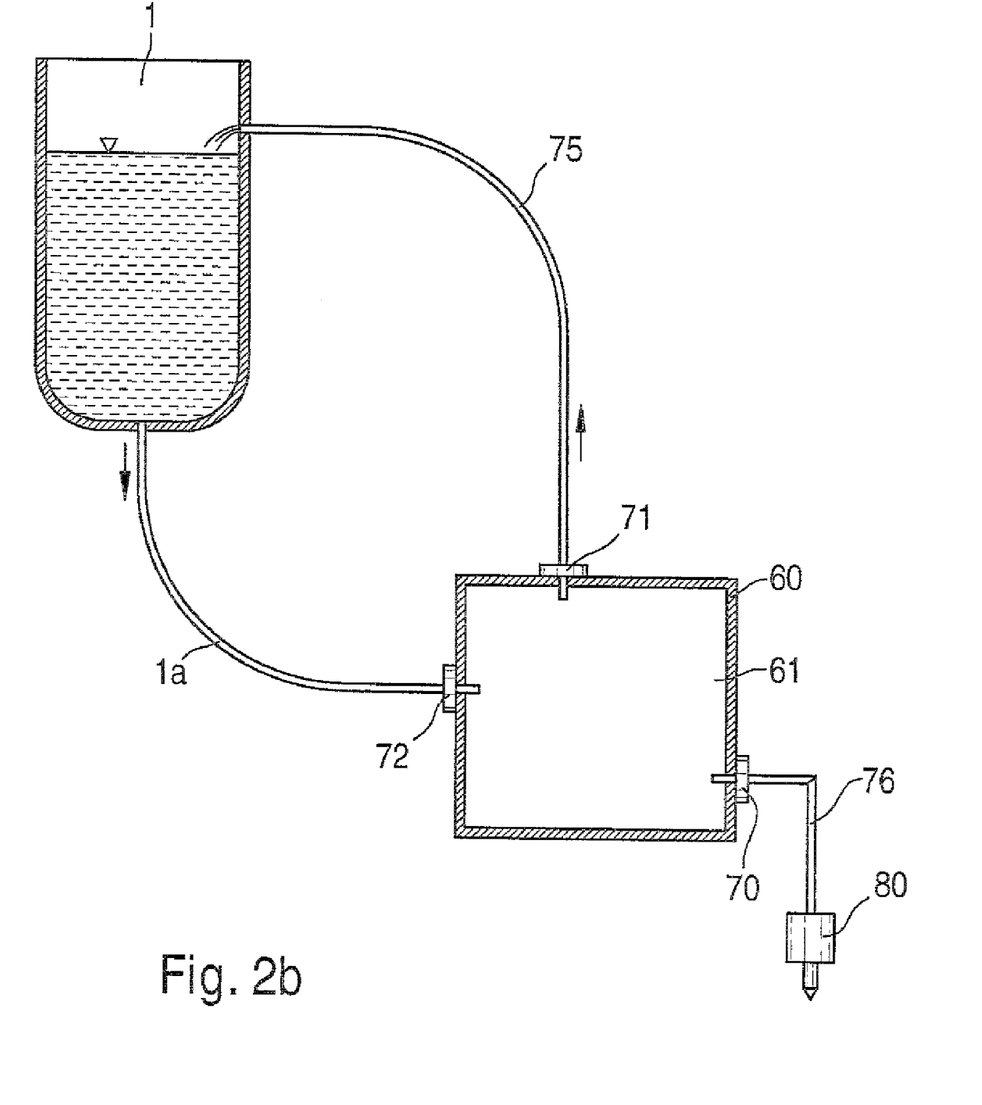
FIG. 2b is a schematic depiction of an exhaust aftertreatment apparatus.

Also in a schematic depiction, FIG. 2b shows an apparatus equipped with a supply module 61 with a housing 60, which is connected by means of flexible tube connections and connector plugs 70, 71, and 72 to a tank 1 for a urea/water solution and to a metering valve 80.

By means of a supply pump 4 integrated into it (see FIG. 2a), for example, the supply module causes a suction of urea/water solution from the tank 1 via the line 1a and the connector plug 72. As a result, urea/water solution remains available to be conveyed further via the connector plug 70 and the supply line 76 to the metering valve 80, which, when it is open, assures a supply of urea/water solution into the exhaust train. Particularly when the metering valve 80 is closed, the supply module 61 continues to transport urea/water solution. The reactant continues to be drawn via the line 1a, but is returned to the urea tank 1 via the connector plug 71 and the return tube 75 so that a fluid circulation can be maintained.

Figure 3:
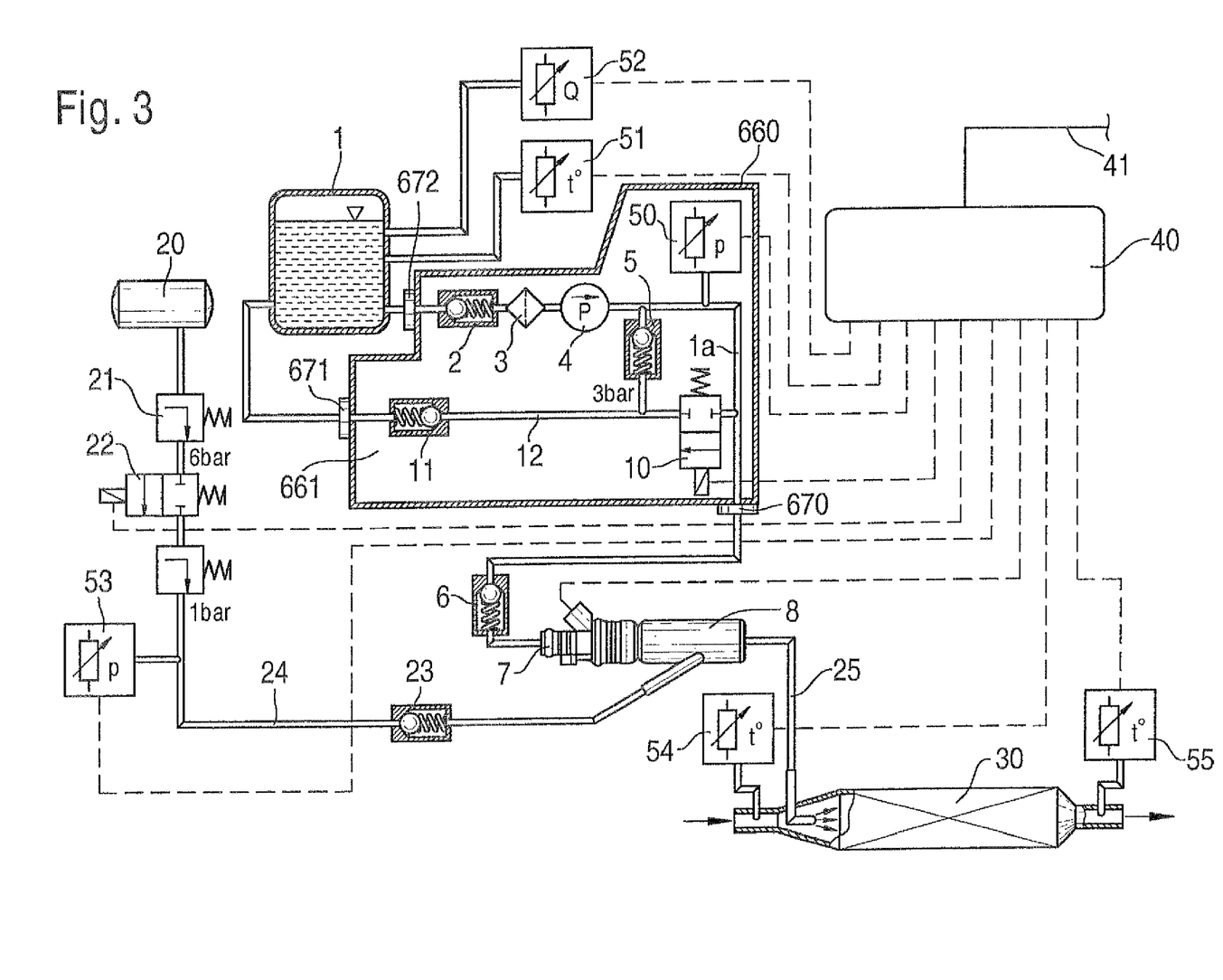
FIG. 3 shows another apparatus for exhaust aftertreatment.

FIG. 3 shows an arrangement, which is equipped with components that have already been described in conjunction with FIG. 1 and in which a urea/water solution is supplied to the exhaust train in a compressed air-assisted fashion through the production of an aerosol. In this case, the check valve 2, the filter 3, the supply pump 4, the pressure regulator 5, the pressure sensor 50, the line 1a, the bleed valve 10, the return line 12, and the additional check valve 11 are structurally integrated into a supply module 661 that is enclosed by a housing 660. In a manner similar to the design shown in FIG. 2b, the line leading to the pump, the return line, and the line leading from the pump toward the metering valve 7 are connected by means of respective connector plugs 672, 671, and 670 to lines that are connected to the urea tank or the metering valve.

Figure 4:
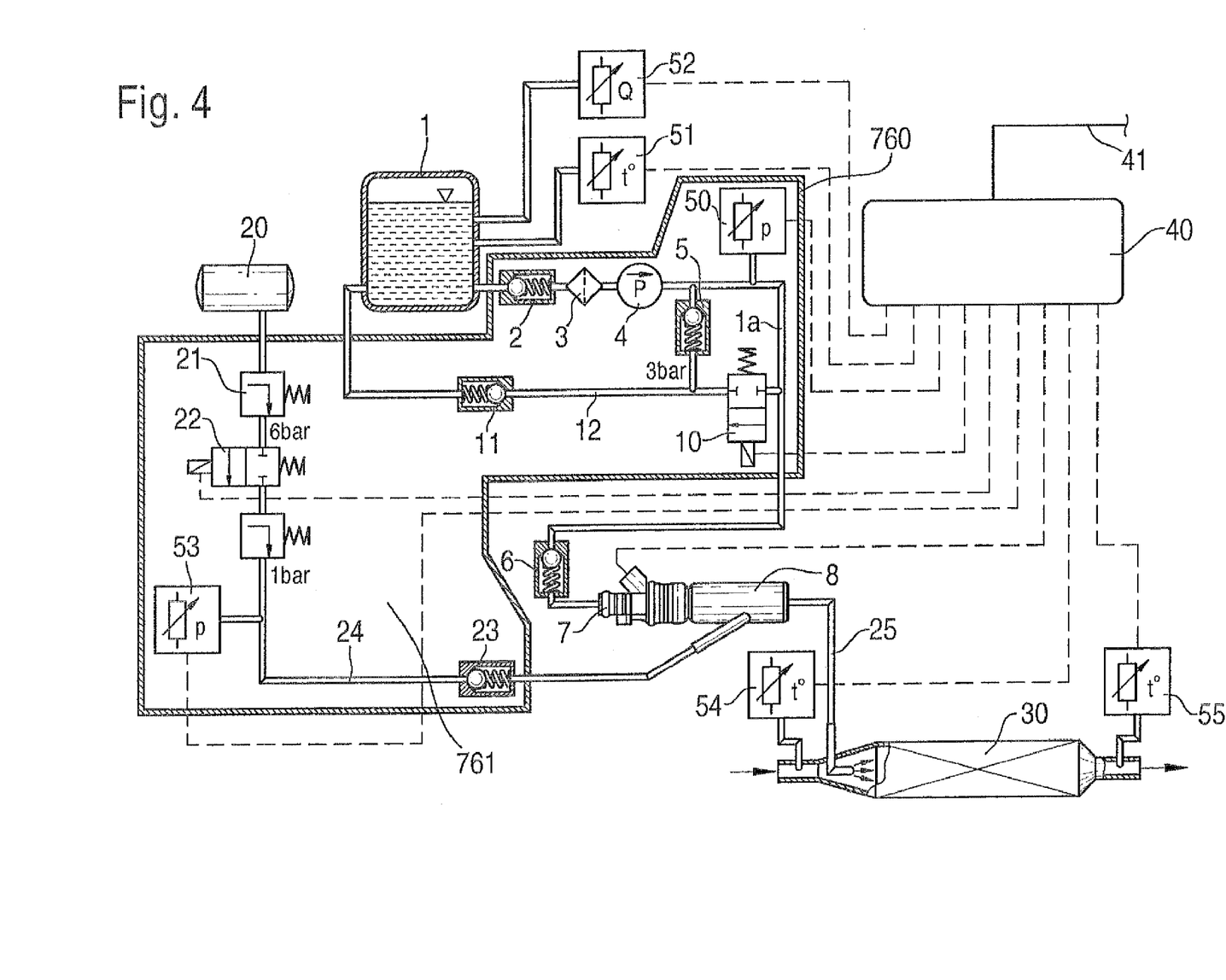
FIG. 4 shows an apparatus with an alternative supply module.

FIG. 4 shows an arrangement that is equipped with the same components as in FIG. 3, but in addition to the check valve 2, the filter 3, the supply pump 4, the pressure regulator 5, the pressure sensor 50, the line 1a, the bleed valve 10, the return line 12, and the additional check valve 11, the components 21 through 24 and 53 are integrated into a supply module 761 that is encompassed by a housing 760.

Figure 5:
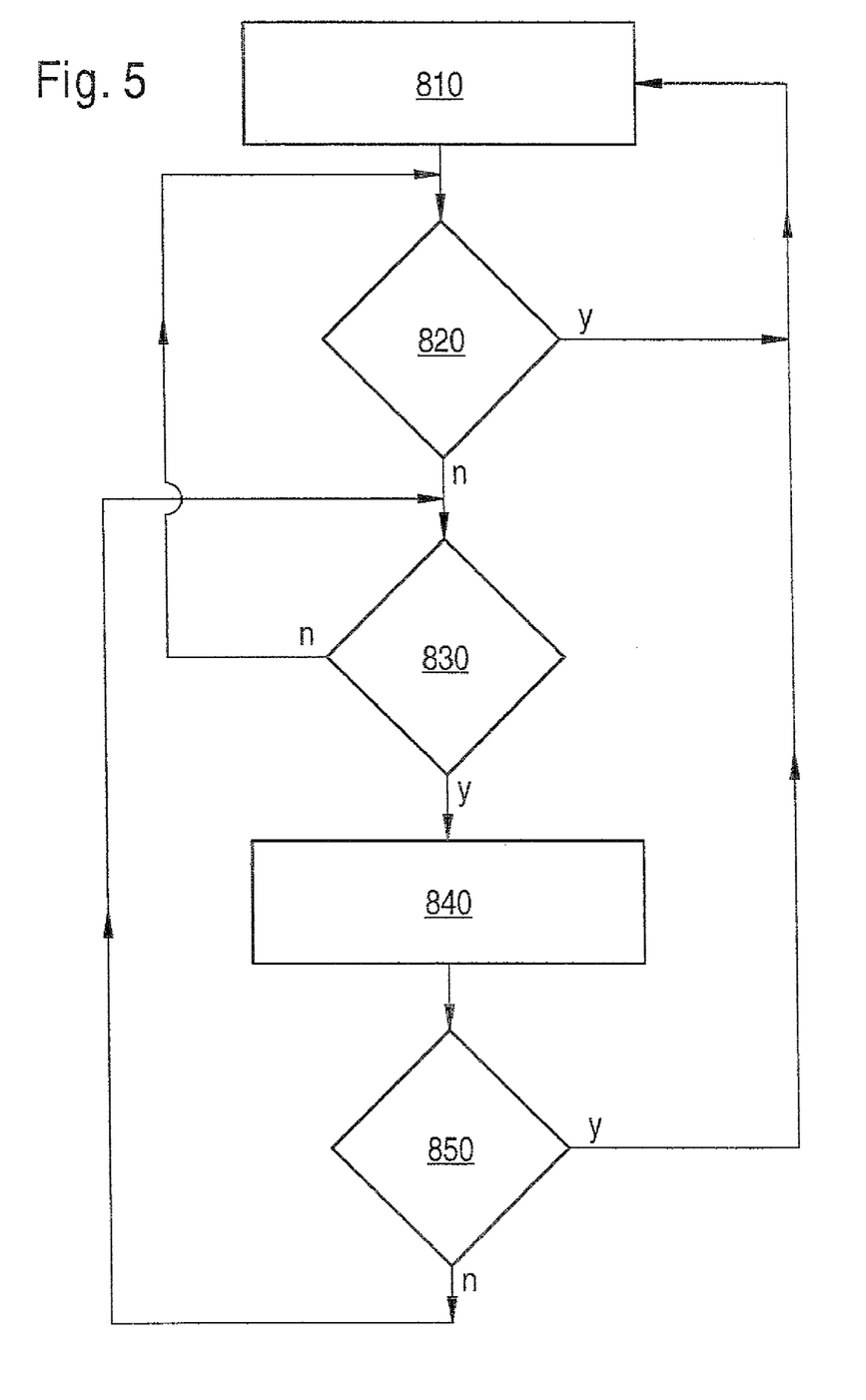
FIG. 5 is a flowchart.

With the apparatuses described in conjunction with FIGS. 2a through 4, i.e. both with compressed air-assisted reactant injections and with injections unassisted by compressed air, it is possible to execute a method of the kind schematically depicted in the form of a flowchart in FIG. 5. This method can be implemented in the control unit 40 in either a hardware-based or software-based fashion. The method step 810, i.e. the normal metering operation, is followed by a query 820 to establish whether there is still a need for metering. The query 830 makes a continuation of the process contingent on the currently prevailing outside temperature. Method step 840 includes steps for freeze prevention and the query 850 determines whether reactant should continue being metered into the exhaust train.

During normal metering operation (method step 810), the metering valve 7 or 80 supplies reactant into the exhaust train downstream of the engine. In the course of this, a query is continuously repeated (query 820) as to whether there is still a need for metering and whether metering is still permitted. For example, metering is no longer permitted when the urea tank 1 is no longer fall enough—if more is withdrawn for metering purposes—to be able to assure a circulating operation, which will be described in detail below. Also in the event of a malfunction, metering is no longer permitted, for example, if the measurement of the catalytic converter temperature yields implausible values. It is also possible before the actual start of the metering operation to monitor the catalytic converter temperature and to only start the normal metering operation if the catalytic converter is sufficiently warm. If there is no longer a need for metering or if metering is no longer permitted, then in another step in query 830, a query is made as to the temperature of the urea/water solution in the urea tank or alternatively a query is made as to the outside temperature. If the temperature is not below a certain threshold (temperature of the urea/water solution below −5 degrees Celsius or outside temperature below −11 degrees Celsius), then the process returns to the query 820. But if the temperature has fallen below the relevant threshold, then in method step 840, freeze-prevention steps that will be explained in detail below are initiated. In the course of this, a query is continuously repeated (query 850) as to whether further metering should occur. If not, then the process jumps back to the query 830, otherwise, it returns to method step 810.

In the arrangement according to FIGS. 2a and 3, when the metering valve 7 is closed and the bleed valve 10 is closed, the pump 4 is triggered so that it exceeds the threshold value of 3 bar of the pressure regulator 5 so that a circulation circuit of the reactant is produced, which continuously flushes the connector plugs 71 and 72 (or 671 and 672) with reactant.

Alternatively, when the metering valve is closed, the bleed valve 10 can be opened and the pump 4 can be switched on or remain switched on so that even at a pressure of less than 3 bar, a circulation circuit can be produced. If these connector plugs are flushed, it is possible to prevent a freezing of the reactant, particularly at times other than when metering operation is occurring, even in regions of the apparatus that are at risk of freezing. If special steps for freeze-prevention are not taken, then these regions are especially prone to the freezing of the reactant because the reactant has a particularly effective cooling contact with the environment due to the connection to the housing of the supply module. Alternatively, the pressure regulating valve 5 can also be replaced by an electrically triggerable valve that assumes the function of a pressure regulating valve during the metering operation and can be opened to establish a circulation circuit when the metering valve is closed. Alternatively, the above-mentioned electrically triggerable valve can also be provided in addition to the pressure regulator 5 and connected in parallel with it. In addition to the establishment of a circulation circuit, it is also possible for additional steps to be taken in order in particular to protect the region of the connector plug 70 (FIG. 2a) or 670 (FIG. 3) from a freezing of the reactant. These optional additional steps relating to the connector plug 70 or 670 will be described below in conjunction with FIG. 6.

The freeze-prevention method using a circulation circuit can also be continued after the internal combustion engine is switched off. In another alternative embodiment, it is also possible to eliminate the query of the temperature of the outside air or of the reactant contained in the reactant reservoir in order to establish a circulation circuit that does not include the metering device and/or the metering valve at all times except during metering operation—possibly even after the internal combustion engine is switched off. It is also possible for the circulation to occur only if or as long as the on-board electrical system of the vehicle of the internal combustion engine has sufficient energy reserves to start the engine again.

Figure 6:
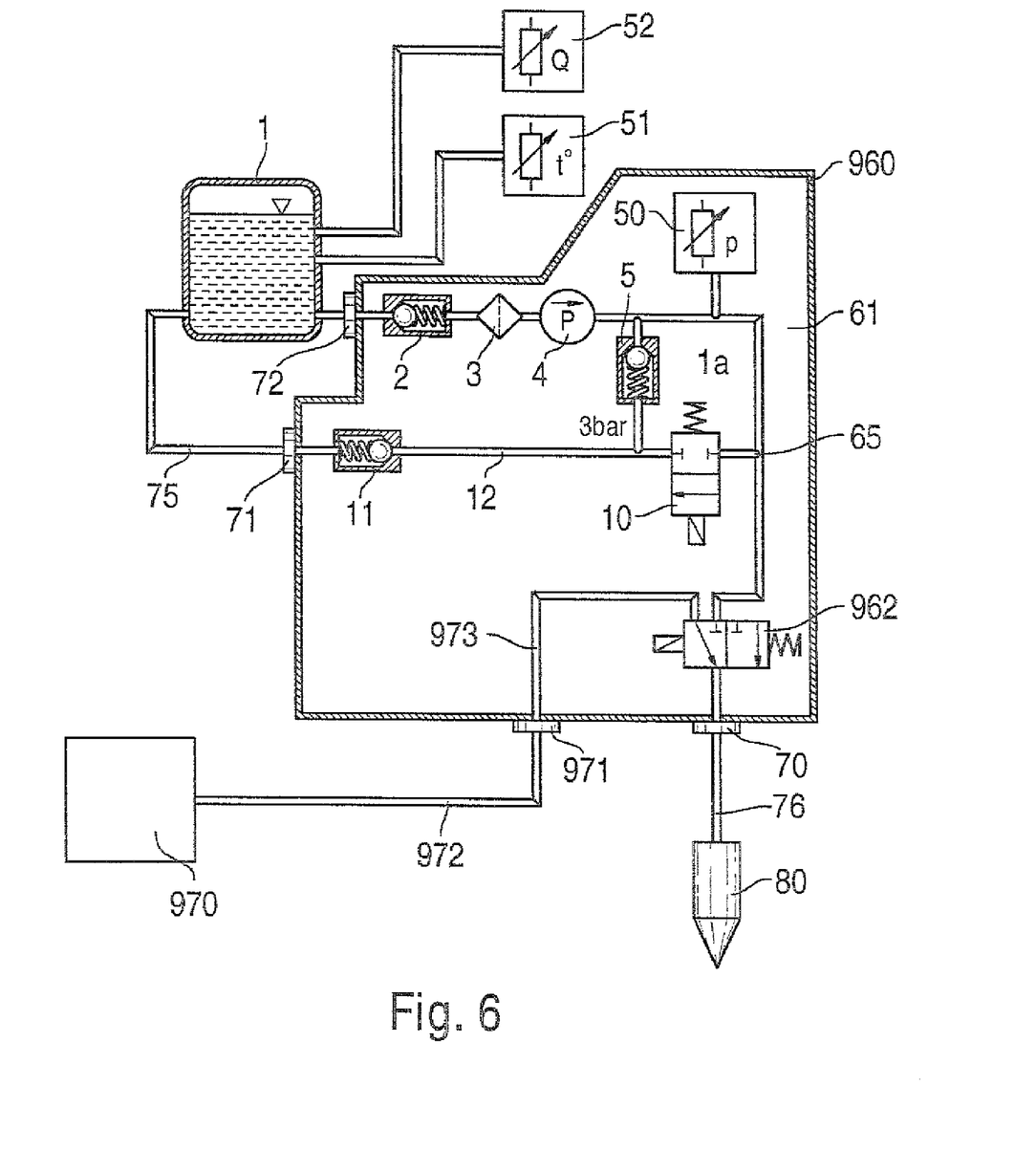
FIG. 6 shows another apparatus for metered reactant introduction into the exhaust train without compressed air, equipped with means for blowing out the reactant.

FIG. 6 illustrates a further modification of the system according to FIG. 2a, which was for an injection of reactant, in particular a urea/water solution, into the exhaust train without the use of compressed air. By contrast with the supply module 60 according to FIG. 2a, the supply module 960 also has a reversing valve 962 and a compressed air line 973 that connects the reversing valve to a compressed air connector plug 971. The reversing valve (which can be triggered by the electric control unit that is not shown in detail) connects the connector plug 70 and metering valve 80 either to the line 1a connected to the pump 4 or to the connector plug 971. At this connector plug 971, the supply module 960 is connected by means of another compressed air line 972 to an electrically triggerable compressed air supply device 970, which can likewise be controlled by means of the above-mentioned electric control unit. For example, this compressed air supply device includes a compressed air cartridge and a means for metering the compressed air, in particular a compressed air valve that can be electrically triggered. Alternatively, the means for metering the compressed air can also be supplied with compressed air coming from a compressed air source that is already provided on board the motor vehicle—or example a compressed air reservoir—or coming directly from a compressor in a pressure-controlled fashion.

In addition to the establishment of a circulation circuit for preventing the connector plugs 71 and 72 from freezing, as explained in the description of FIG. 5, an arrangement according to FIG. 6 also provides a measure for preventing the connector plug 70 from freezing. To this end, the reversing valve 962 disconnects the connection between the line 1a and the supply line 76 and, as shown in FIG. 6, the metering valve is connected to the compressed air supply device 970 by means of the compressed air lines 972 and 973. The means for metering the compressed air is triggered and reactant still present in the supply line 76 or in the region of the connector plug 70 is blown out into the exhaust train. After a certain time, the compressed air supply is switched off, but the reversing valve remains in the above-described position for the flushing of the metering valve in order to prevent reactant from flowing out of the line 1a into the region of the connector plug 70. Only when metering operation is resumed is the reversing valve reversed again so that the metering valve can once again be acted on with reactant. As a result, the region of the connector plug 70 also remains protected from freezing.

The foregoing relates to a preferred exemplary embodiment of the invention, it being understood that other variants and embodiments thereof are possible within the spirit and scope of the invention, the latter being defined by the appended claims.

The invention claimed is:

1. A method for the aftertreatment of exhaust gases of an internal combustion engine using a reagent which is to be introduced into the exhaust gases, in which method the reagent is pumped by means of a feed device (4) from a reagent tank (1) to a metering device, such that the reagent can be introduced in a metered fashion into an exhaust line of the internal combustion engine according to the opening of the metering device, with it being possible for reagent to be returned from the feed device (4) to the reagent tank (1) via a return line (12, 75), characterized in that the feed device is contained within a feed module and the reagent can circulate between the feed device (4) and the reagent tank (1) in such a way that freezing of the reagent is prevented, particularly when the metering device is closed, with the circulation taking place between the reagent tank and the feed module, with the feed module being connected by means of a supply line (76), which is not involved in said circulation, to the metering device, and wherein the circulation takes place only if the temperature of the external air or of the reagent situated in the reagent tank falls below a threshold value.

2. The method according to claim 1, wherein the circulation occurs continuously.

3. The method according to claim 1, wherein the circulation is only performed if the temperature of the outside air or of the reactant contained in the reactant reservoir is below a threshold.

4. The method according to claim 1, wherein the reducing agent is a urea/water solution.

5. An apparatus for the aftertreatment of exhaust gases of an internal combustion engine using a reactant to be introduced into the exhaust, in particular a reducing agent, the apparatus comprising means for executing a method according to claim 1.

6. The method according to claim 1, wherein the circulation occurs at times in which no reactant is being introduced into the exhaust line.

7. The method according to claim 6, comprising performing the circulation either when the internal combustion engine is switched on or off.

8. The method according to claim 1, comprising performing the circulation either when the internal combustion engine is switched on or off.

9. The method according to claim 8, wherein when the circulation is performed with the engine switched off, this circulation only occurs if or as long as the on-board electrical system of the motor vehicle of the internal combustion engine has sufficient energy reserves to start the engine again.

10. The method according to claim 1, further comprising flushing the supply line to the metering device with a gas after a metering operation in order to drive out reactant remaining in the supply line after the metering.

11. The method according to claim 10, wherein the circulation occurs at times in which no reactant is being introduced into the exhaust line.

12. The method according to claim 10, comprising performing the circulation either when the internal combustion engine is switched on or off.

13. The method according to claim 12, wherein when the circulation is performed with the engine switched off, this circulation only occurs if or as long as the on-board electrical system of the motor vehicle of the internal combustion engine has sufficient energy reserves to start the engine again.

* * * * *